United States Patent
Guntersweiler et al.

(10) Patent No.: US 10,239,369 B2
(45) Date of Patent: Mar. 26, 2019

(54) TRAILER FOR A BICYCLE

(71) Applicant: BRUEGGLI, Romanshorn (CH)

(72) Inventors: Reto Guntersweiler, Frauenfeld (CH); Simon Hasenfratz, Greifensee (CH)

(73) Assignee: BRUEGGLI, Romanshorn (CH)

( * ) Notice: Subject to any disclaimer, the term of this patent is extended or adjusted under 35 U.S.C. 154(b) by 86 days.

(21) Appl. No.: 15/323,288

(22) PCT Filed: Jun. 22, 2015

(86) PCT No.: PCT/EP2015/001255
§ 371 (c)(1),
(2) Date: Dec. 30, 2016

(87) PCT Pub. No.: WO2016/000810
PCT Pub. Date: Jan. 7, 2016

(65) Prior Publication Data
US 2017/0144497 A1 May 25, 2017

(30) Foreign Application Priority Data
Jul. 1, 2014 (DE) .................. 10 2014 009 746

(51) Int. Cl.
*B60D 1/62* (2006.01)
*B62M 7/14* (2006.01)
(Continued)

(52) U.S. Cl.
CPC .................. *B60D 1/62* (2013.01); *B60T 7/20* (2013.01); *B62K 27/003* (2013.01); *B62M 6/50* (2013.01);
(Continued)

(58) Field of Classification Search
CPC ....... B60D 1/62; B60D 2001/003; B60T 7/20; B62M 6/50; B62M 7/14; B62M 7/16; B62K 27/003; B62K 2207/00
(Continued)

(56) References Cited

U.S. PATENT DOCUMENTS

2011/0042154 A1* 2/2011 Bartel ...................... B60L 7/10
180/11
2015/0115573 A1 4/2015 Bossel

FOREIGN PATENT DOCUMENTS

| CA | 2327451 A1 | 5/2002 |
| CH | 241131 A | 2/1946 |

(Continued)

OTHER PUBLICATIONS

Machine Translation, DE 10 2010 051838 A1, Neubauer et al., May 24, 2012.*
(Continued)

*Primary Examiner* — Joseph M Rocca
*Assistant Examiner* — Felicia L. Brittman
(74) *Attorney, Agent, or Firm* — Caesar Rivise, PC

(57) ABSTRACT

The invention relates to a trailer (2) for a bicycle (1), having a braking device acting on wheel(s) (4) of the trailer (2); a sensor device (12) which supplies a measured variable, which is a measure of an acceleration force acting on the trailer (2) via a tow bar (5); a controller (18) for controlling the braking device and that is configured to act on the braking device, depending on the measured variable determined by the sensor device (12), such that an inertial force of the trailer (2) generated in the pulling mode or during braking of the bicycle (1) is compensated for or is at least reduced; and a decoupling device (10; 410; 510) which is configured for the partial mechanical decoupling of a move-
(Continued)

ment of the bicycle trailer (2) with respect to the bicycle (1) in the longitudinal direction of the bicycle trailer (L).

22 Claims, 3 Drawing Sheets

(51) Int. Cl.
*B62K 27/00* (2006.01)
*B60T 7/20* (2006.01)
*B62M 6/50* (2010.01)
*B60D 1/00* (2006.01)

(52) U.S. Cl.
CPC ............. *B62M 7/14* (2013.01); *B62M 7/16* (2013.01); *B60D 2001/003* (2013.01); *B62K 2207/00* (2013.01)

(58) Field of Classification Search
USPC .......................................... 280/204
See application file for complete search history.

(56) References Cited

FOREIGN PATENT DOCUMENTS

| | | |
|---|---|---|
| CN | 203473157 U | 3/2014 |
| DE | 202007014273 U1 | 6/2008 |
| DE | 202010010674 U1 | 11/2010 |
| DE | 102010051838 A1 | 5/2012 |
| DE | 102012103404 A1 | 10/2013 |
| FR | 2966797 A1 | 5/2012 |
| JP | 2007015674 A | 1/2007 |

OTHER PUBLICATIONS

English language abstract for FR 2966797 A1 (2012).
English language abstract for DE 102010051838 A1 (2012).
International Search Report from corresponding PCT/EP2015/001255 dated Aug. 31, 2015.
English Abstract of CN 203473157 U (2014).
Machine Translation of DE 202007014273 U1 (2008).
English Abstract of DE 202010010674 U1 (2010).
Chinese Office Action dated Sep. 27, 2018.

\* cited by examiner

TRAILER FOR A BICYCLE

CROSS-REFERENCE TO RELATED APPLICATIONS

This application is the U.S. National Phase Application of PCT/EP2015/01255, filed Jun. 22, 2015, which claims priority to DE 10 2014 009 746.3, filed Jul. 1, 2014, the contents of which applications are incorporated herein by reference in their entireties for all purposes.

BACKGROUND OF THE INVENTION

The invention relates to a trailer for a bicycle, having a tow bar for coupling to the bicycle and a braking device acting on one wheel or the wheels of the trailer.

Trailers for bicycles have long been known. Most of these trailers are not equipped with a drive or brake and, because of the limited driving power of the cyclist, this has a negative effect on travelling speed and on handling behavior during braking. Gradients are particularly difficult to negotiate during the ascent and pose a big problem when braking during the descent, in case the trailer has a comparatively large mass. For this reason, the prior art has proposed bicycle trailers equipped with their own drive and a braking device.

A bicycle trailer of this kind is described in DE 10 2010 051 838 A1, for example. This bicycle trailer has an electronic logic circuit acting on the brake of the trailer and configured so that the trailer does not exert any noticeable effect upon the handling behavior of the bicycle in wheeling mode or on braking of the bicycle. Signals from a pedal pressure sensor, a braking force sensor, a force sensor in the region of the trailer coupling and a revolution sensor are sent to the electronic logic circuit. With the exception of the revolution sensor, which is arranged in the region of one of the trailer wheels, the sensors are arranged on the bicycle.

The disadvantage of the proposed trailer is that it cannot be universally used in the proposed manner with conventional bicycles, since the trailer requires sensor data acquired on the bicycle side. Thus the trailer can only be used in the proposed operating mode with a bicycle that is fitted with the corresponding sensors to capture the data required for the logic circuit.

DESCRIPTION OF THE INVENTION

An object of the invention is therefore to provide a better trailer for a bicycle that avoids the disadvantages of conventional bicycle trailers. The object of the invention is in particular to provide a bicycle trailer that does not have any noticeable effect upon the handling behavior of the bicycle on braking of the bicycle and can be universally used with conventional bicycles.

These objects are achieved by a trailer for a bicycle with the features of the independent claim. Advantageous embodiments and applications of the invention are the subject of the dependent claims and are explained in more detail in the following description, in some cases with reference to the figures.

In line with the prior art, the bicycle trailer of the invention comprises a tow bar for coupling to the bicycle and a braking device acting on one wheel or the wheels of the trailer. The braking device can be executed as an electrically operated mechanical brake.

According to general aspects of the invention, the trailer further comprises a sensor device, which supplies a measured variable that is a measure of the acceleration force acting on the trailer via a tow bar. The sensor device can be configured, for example, as a force sensor that measures a force acting on the tow bar. According to a further aspect, the sensor device can be configured as a displacement measuring unit that determines a displacement (deflection) that is caused by the acceleration force acting on the trailer. The sensor device can be integrated in the coupling, in the tow bar or in the attachment between tow bar and trailer.

The trailer further comprises a controller acting on the braking device of the trailer, which is configured to act on the braking device, depending on the measured variable determined by the sensor device, in such a manner that an inertial force of the trailer generated during braking of the bicycle is compensated for or is at least reduced.

The trailer therefore comprises a feedback control loop, wherein the measured variable determined by the sensor device serves as a control variable for the controller, which in turn outputs a corresponding correcting variable to the braking device. The controller determines a value of the correcting variable such that, when the bicycle brakes are applied, the bicycle trailer is decelerated in such a manner as to reduce or compensate for an inertial force of the trailer. As a result of compensation of the inertial force, the trailer does not have any noticeable effect upon the handling behavior of the bicycle in cycling mode.

Hence, a particular advantage of the invention is that the handling characteristics of a bicycle coupled to the trailer are less altered or preferably imperceptibly altered for the rider when he brakes, due to the brake control implemented in the trailer. In particular, the braking distance is shortened, thereby increasing road safety.

The trailer further comprises a decoupling device that is configured for the partial mechanical decoupling of a movement of the bicycle trailer relative to the bicycle in the longitudinal direction of the bicycle trailer. A movement in the longitudinal direction is understood to mean a movement in or against the direction of travel. Thus the decoupling device allows a limited movement of the bicycle trailer relative to the bicycle in or against the direction of travel, if the trailer is coupled to the bicycle, especially in such a manner that the bicycle trailer has a delayed response to a pulling action or braking motion of the bicycle.

The partial mechanical decoupling offers the advantage of smoothing out sudden acceleration forces and delaying the reaction of the trailer body so that the inertial force of the trailer body is not immediately perceived by the cyclist.

The delayed reaction of the trailer body can be used by the control loop to determine the value of the correcting variable, in order to apply an appropriate counterforce according to the determined value of the correcting variable to compensate for or reduce the inertial force generated in the trailer.

Furthermore, in conjunction with the partial mechanical decoupling, it is possible to achieve particularly jerk-free compensation of inertial forces, that is less noticeable for the cyclist and improves handling dynamics.

A further advantage is that the provision of the decoupling device allows particularly accurate and from an engineering design perspective, simple determination of the above-mentioned measured variable, which is a measure for an acceleration force acting on the trailer via the tow bar, which will be explained in more detail below.

According to a particularly preferred embodiment of the invention, the trailer further comprises an electric drive to drive the trailer, wherein the controller is further configured to accelerate the trailer by means of the electric drive, depending on (as a function of) the measured variable determined by the sensor device, in such a manner that an inertial force of the trailer generated during traction mode of the bicycle is compensated for or is at least reduced.

This can take the strain off the cyclist, especially on uphill gradients. By operating the braking device and the drive device, the force in the tow bar can preferably be controlled to a value of zero, so that the cyclist no longer perceives the trailer as an inertial mass. A further advantage is that the trailer according to the invention does not require an operating unit or sensor device that is provided on the bicycle for operating the control circuit and can therefore be used flexibly with conventional bicycles, which only require a standard coupling for attaching the tow bar.

The decoupling device is advantageously provided with a spring-damping function, i.e. the decoupling device has spring-like and damping properties. The spring function allows the decoupling device to be restored to a middle position, whilst the damping function limits the vibrations that occur.

According to a preferred embodiment, the sensor device can be provided on the decoupling device. Furthermore, the sensor device can be configured to derive a measure for the acceleration force acting on the trailer via the tow bar using the limited relative movement between bicycle and trailer facilitated by the decoupling device. The acceleration forces acting on the trailer in the direction of travel can be exactly determined by means of the limited relative movement between bicycle and trailer.

For example, the sensor device can be configured to determine a displacement or deflection of a moving element of the decoupling device, the displacement of the moving element being a measure for an acceleration force acting on the trailer via the tow bar.

Alternatively or additionally, the sensor device may include a force sensor, with which the acceleration force acting on the decoupling device can be directly measured.

In terms of the measuring principle used or the structural design of the sensor device, the invention is not restricted to any particular type.

For example, the sensor device can comprise at least one resistance strain gauge, which is a cost-effective and easy-to-assemble option, since a resistance strain gauge can be directly bonded to the element that is subjected to strain due to the force exerted by the cyclist. Further, the sensor device may comprise a Hall effect sensor and/or a piezoelectric bending beam sensor.

According to a further aspect of the invention, limit stop means can additionally be provided on the decoupling device, said limit stop means limiting a movement of the bicycle trailer relative to the bicycle to a predetermined maximum value. As a result, large acceleration forces do not have to be completely absorbed by the spring-damping function of the decoupling device, but can be absorbed by the limit stop means. The moving elements of the decoupling device can then be designed for smaller forces and the sensor device for a smaller measurement range, so that they could work more accurately.

This means in particular that accurately resolved force or displacement measurement can be performed on the decoupling device and this can then be used as a measure for the acceleration forces acting on the trailer.

The decoupling device can be provided in the connection between the bicycle and the trailer, for example on the coupling between bicycle and trailer or along the tow bar.

However, another embodiment is particularly advantageous, wherein a trailer-side end of the tow bar is attached to the trailer body, e.g. on the trailer frame, by means of the decoupling device.

According to a particularly advantageous embodiment of the invention, the decoupling device comprises two bending elements, which are each attached to the trailer body at one end and to the tow bar at the opposite end. When they are not deflected, the bending elements extend substantially transverse to the longitudinal direction of the trailer and are bendable in the longitudinal direction of the trailer.

The two bending elements are preferably plate-shaped and can, for example, be made from a carbon fiber composite. The spring-like and damping properties of the decoupling device formed by the bending elements can be adjusted via the appropriate choice of size, thickness and material of the bending elements.

A particular advantage of this embodiment lies in its structurally simple design, since no additional bearing or bearing elements are necessary.

Furthermore, the sensor device may have at least one piezoelectric bending beam sensor arranged parallel to one of the bending elements in such a manner that the piezoelectric bending beam sensor performs a deflection corresponding to the bending element when subjected to a force and the charge displacement of the piezoelectric element is therefore proportional to the deflection of the bending element.

The sensor device can further comprise a Hall effect sensor arranged so that a magnetic flux of the sensor is proportional to the deflection of the bending elements. To this end, the sensor can be mounted on the trailer and a corresponding magnet mounted adjacent to it on the tow bar.

Furthermore, as an alternative or in addition to the above-mentioned embodiment of the sensor device, it is also possible for the sensor device to comprise one or more resistance strain gauges that are attached, e.g. glued onto, one or both bending elements. The resistance strain gauge can be used to measure the elongation of the bending elements. The acceleration force can be deduced from the elongation.

Instead of the two bending elements mentioned above, the decoupling device can also comprise two pivot arms, which are each rotatably attached at one end to the trailer body and rotatably attached to the tow bar at the opposite end and extend perpendicularly to the longitudinal direction of the trailer. According to this embodiment, a bending body may be provided, which is attached to the trailer body at one end and to the tow bar at the opposite end and which extends perpendicularly to the longitudinal direction of the trailer and which is bendable in the longitudinal direction of the trailer.

According to this aspect, the spring stiffness and damping of the decoupling device are provided not by the two pivot arms but by the additional bending body, which in turn is subject to shearing stress.

It is a particular advantage of this aspect that there is hardly any load on the load-bearing mechanical elements provided as the pivot arms. Should the bending body be damaged, the tow bar would continue to be firmly attached to the trailer via the pivot arms. Moreover, this embodiment allows a simpler design of the overall system but is associated with higher manufacturing and assembly costs than the bending elements. Also, additional bearings are required.

According to yet another aspect of the above-mentioned embodiments comprising bending arms or pivot arms, the invention also provides the possibility of using limit stops as limit stop means, e.g. stop plates, which are arranged offset relative to the bending elements or pivot arms in the longitudinal direction of the trailer in such a manner that a deflection of the bending elements or pivot arms in the longitudinal direction is limited by the limit stops. At least two limit stops are preferably provided to limit a deflection in and against the direction of travel.

As regards the structural arrangement of the decoupling device, it is not restricted to the two above-mentioned embodiments with the bending elements or the pivot arms, although these are particularly advantageous from a cost and manufacturing point of view.

Thus, according to a further embodiment, it is possible for the decoupling device to comprise at least one spring that deflects in the longitudinal direction. For example, the translational degree of freedom of the decoupling device in the longitudinal direction of the trailer can be achieved by means of a guide mechanism, by means of which a carriage is able to slide in the longitudinal direction, delimited by limit stops. The guide mechanism can be realized using a guide rail and linear ball bearing, for example. Two springs that are deflectable in the longitudinal direction of the trailer can be fixed to the carriage to create the spring-damping function. Here one spring is fastened to the tow bar by its end that is not fastened to the carriage and the other spring is fastened to the trailer body by its end that is not fastened to the carriage. The carriage may be provided as a Z-shaped plate, wherein one spring is fastened to each of the diagonally opposite ends.

The electric drive can take the form of a wheel hub motor. The wheel hub motor is preferably only provided on one of the wheels of the trailer, since this is advantageous in terms of cost and also makes for better handling characteristics on bends. According to a further aspect, a wheel hub motor can be attached to each of the two wheels of the trailer. The electric drive can also take the form of a conventional electric motor.

Within the scope of the invention it is also possible for the braking device of the trailer to be designed as an electrical machine acting as a motor and also as a brake, wherein the electrical machine serves as the electric drive when in motor-based operation. A motor brake of this kind can be provided as an alternative to or in addition to an electrically operated mechanical brake.

According to a further advantageous version, the trailer comprises an electrical energy storage device to supply the electric drive. Moreover, the electrical machine can be configured to act as a generator during braking and to use the electrical braking energy to charge the energy storage device by way of a recuperation process.

According to a further embodiment comprising an electrically operated mechanical brake but no electric drive, the control loop can preferably be supplied with energy via a hub dynamo, which charges a small rechargeable battery.

BRIEF DESCRIPTION OF SEVERAL VIEWS OF THE DRAWINGS

The preferred embodiments described above and features of the invention can be combined with each other as needed. Further details and advantages of the invention are described below with reference to the attached drawings. The figures show:

FIG. 1 shows a schematic plan view onto a vehicle combination comprising a bicycle 1 and a trailer 2. The trailer 2 is fastened to the bicycle in a coupling region 9, via a tow bar 5, at the free end of which a trailer coupling (not shown) is provided. The bicycle 1 has a corresponding coupling for this purpose and is designed in a conventional manner.

Figure 1:
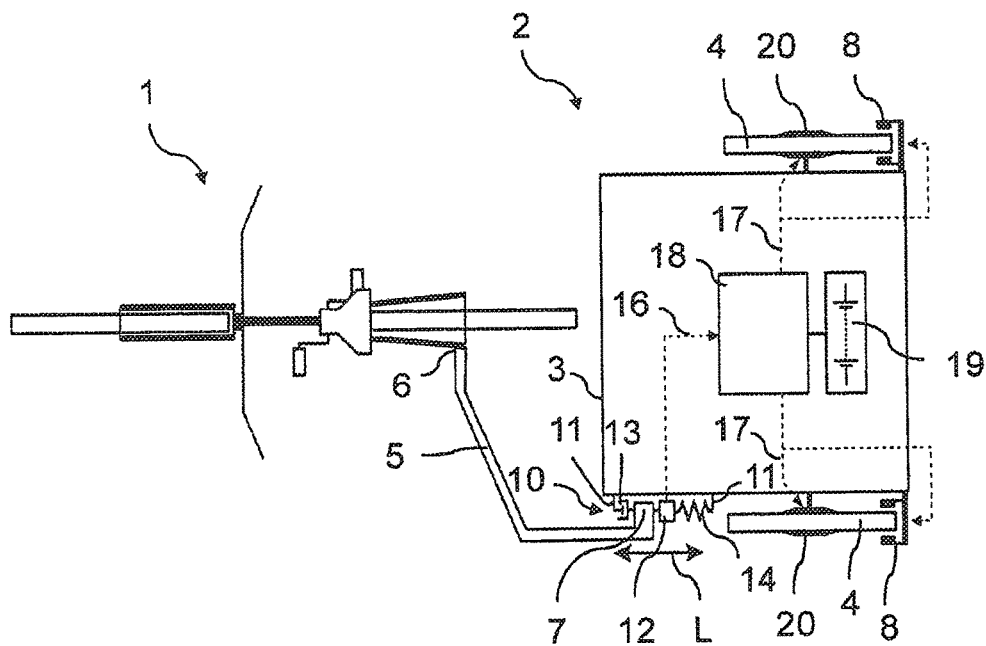
FIG. 1 a schematic plan view onto a vehicle combination comprising a bicycle and a trailer according to an embodiment of the invention.

In the illustrated embodiment, the trailer 2 is provided with two wheels 4, which have electric wheel hub motors 20.

The structure of the bicycle trailer 2 without tow bar 5 is referred to in the present document as the trailer body 3. Electrically operated mechanical wheel brakes 8 are arranged on the two wheels 4 and are controlled by an electronic control device configured as a feedback controller 18. The trailer 2 further carries an energy storage device 19, which can be executed in the form of a conventional battery for a so-called E-bike and can be connected via the controller 18 to the electrical machines in the form of the wheel hub motors 20 of the trailer 2.

A decoupling device 10, which is designed for the partial mechanical decoupling of a movement of the bicycle trailer 2 relative to the bicycle 1 in the longitudinal direction of the bicycle trailer, illustrated by the arrow marked L, is provided at the trailer-side end of the tow bar 5.

The highly schematized view in FIG. 1 shows the elements of the decoupling device 10 in a functional rather than in a structural representation. Via the decoupling device 10, the tow bar 5 is fastened in a sprung and damped manner onto the trailer body 3, for example onto the trailer frame, by means of its trailer-side end region 7.

Here the damping property of the decoupling device is represented by the damper 13 and the spring-like property of the decoupling device 10 by the spring 14. Structurally, the spring-like and damping property can be realized in one component with spring-like and damping properties, as is explained below in more detail with reference to further exemplary embodiments.

By means of the decoupling device 10, the tow bar is therefore partially mechanically decoupled from the trailer body 3, so that the trailer body 3 can move to a limited extent in the longitudinal direction L relative to the tow bar and to the bicycle 1. A sensor device 12, for example a force sensor, which supplies a measured variable that is a measure of the acceleration force acting on the trailer 2 via a tow bar 5, is provided in the decoupling device 10.

Measurement signals from the sensor device 12 are transmitted to the electronic controller 18 via an input signal line 16. The controller 18 is part of a control loop and is configured to act on the braking device 8, dependent on (as a function of) the transmitted measured variable of the sensor device 12, in such a manner that an inertial force of the trailer 2 generated during braking of the bicycle 1 is compensated for or is at least reduced. To this end, the controller 18 continuously outputs corresponding corrective signals to the brakes 8 via corresponding output signal lines 17.

The controller 18 is further configured to accelerate the trailer 2, dependent on (as a function of) these measured variables, by activating the wheel hub motors 20 in such a manner that an inertial force of the trailer generated during traction mode of the bicycle is compensated for or is at least reduced. To this end, the controller 18 continuously outputs corresponding corrective signals to the wheel hub motors 20 via corresponding output signal lines 17.

The controller 18 is preferably configured such that, in drive mode, it adjusts the wheel hub motors 20 and the brakes 8, as a function of the control variable continuously measured by the sensor device, so that the force in the tow bar 5 is controlled to zero.

Figure 2:
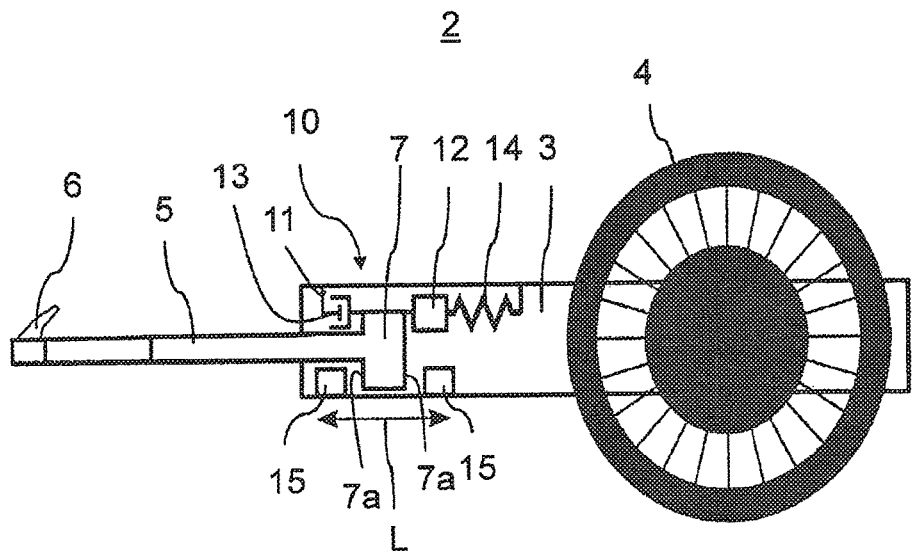
FIG. 2 a side view of FIG. 1.

FIG. 2 shows a schematic side view of FIG. 1. Reference numeral 11 designates the attachment point of the decoupling device 20 on the trailer body 3. It can further be seen from the illustration in FIG. 2, that two limit stops 15 are fastened to the side of the trailer body 3, offset in the longitudinal direction L to the end region 7 of the tow bar 5, said limit stops limiting a relative movement of the tow bar 5, 7, that is facilitated by the decoupling device 10, along the trailer body 3 both in and against the direction of travel.

On a pulling movement of the bicycle 1, the left side 7a of the end region 7 of the tow bar 5, shown in FIG. 2, hits the left limit stop 15, while, when the bicycle brakes, the right side 7a hits the right limit stop 15, thereby limiting the movement of the trailer relative to the bicycle.

Figure 3:
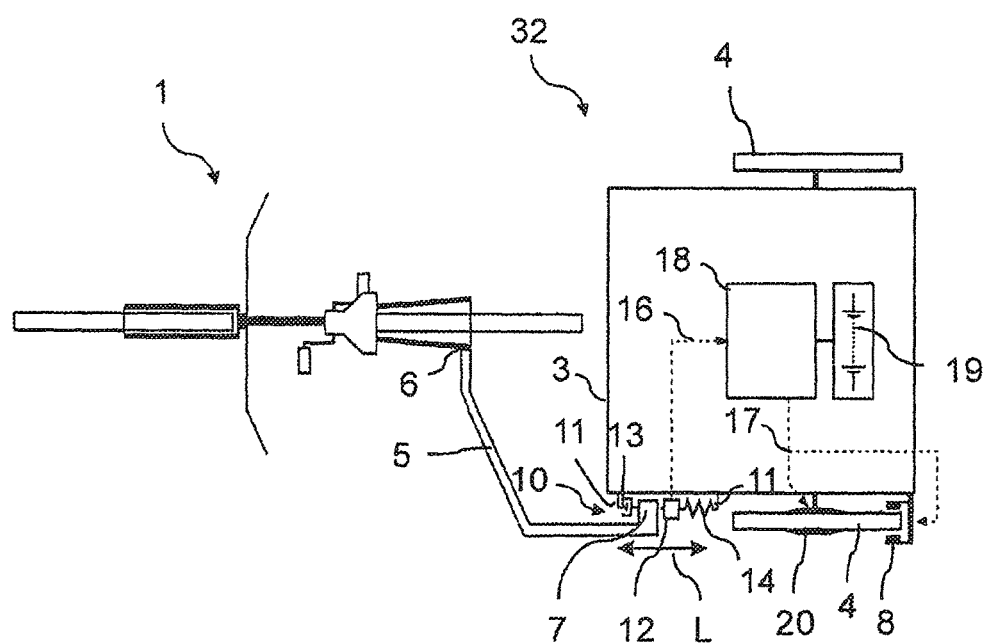
FIG. 3 a schematic plan view onto a vehicle combination comprising a bicycle and a trailer according to a further embodiment of the invention.

FIG. 3 shows a further embodiment. In this embodiment, components with the same reference numerals correspond to the components in FIG. 1 and are not described separately. The particular feature of this embodiment is that an electrically operated mechanical wheel brake 8 and a wheel hub motor 20, which, as described above, are controlled by the controller 18, are provided on one wheel only.

Figure 4:
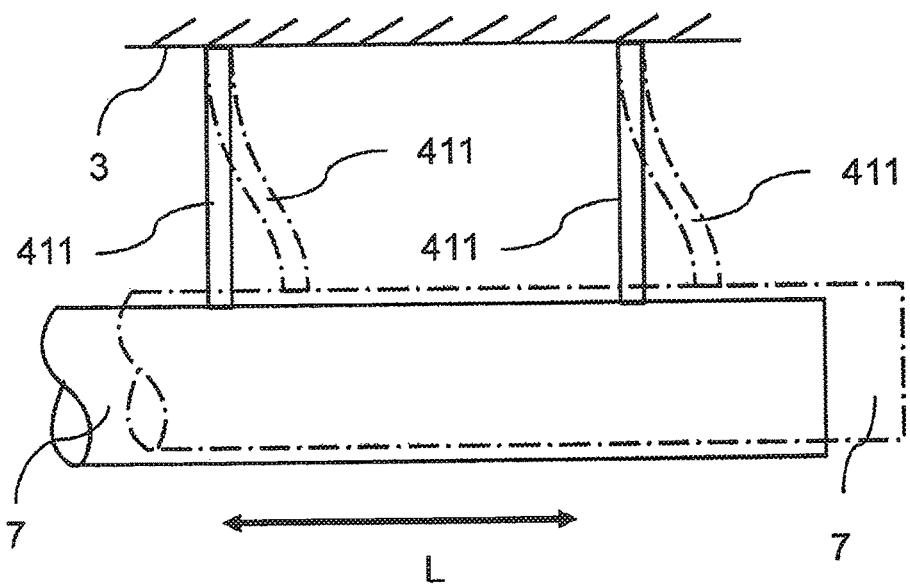
FIG. 4 a detailed view of a decoupling device according to the invention in accordance with one embodiment.

FIG. 4 shows a detailed view of an embodiment 410 for structural implementation of the decoupling device 10. The decoupling device 410, once again shown in highly schematized form, is realized by means of two bending plates 411, which are made from carbon or a carbon composite. The bending plates 411 are non-rotatably fixed at one end to the trailer body 3, for example to the trailer frame, and at the opposite end to the tow bar 5, especially at the trailer end region 7 of the tow bar 5. The bending plates 411 have low stiffness in the direction of travel or longitudinal direction L and, as a result, can bend transverse to the longitudinal direction L of the trailer, thereby creating the translational degree of freedom.

The spring stiffness and desired damping are adjusted by the appropriate choice of the geometry and material of the plates 411. Thus the bending plates 411 constitute the functional components 11, 13 and 14 in FIG. 1.

The broken lines illustrate a state of the decoupling device 410 under the effect of a braking force generated by the bicycle 1 acting on the tow bar 7, so that the trailer 2 or the trailer body 3 shifts in the direction of travel relative to the bicycle (not shown).

The corresponding deflection of the bending plates 411 can be measured by at least one piezoelectric bending beam sensor (not shown) arranged parallel to the bending plates 411, so that the piezoelectric bending beam sensor is subject to a deflection corresponding to the deflection of the bending plates 411. The charge displacement of the integrated piezoelectric element is dependent upon the deflection of the piezoelectric bending beam sensor and can therefore serve as a measure for the acceleration force acting on the trailer 2 via the tow bar 5.

Figure 5:
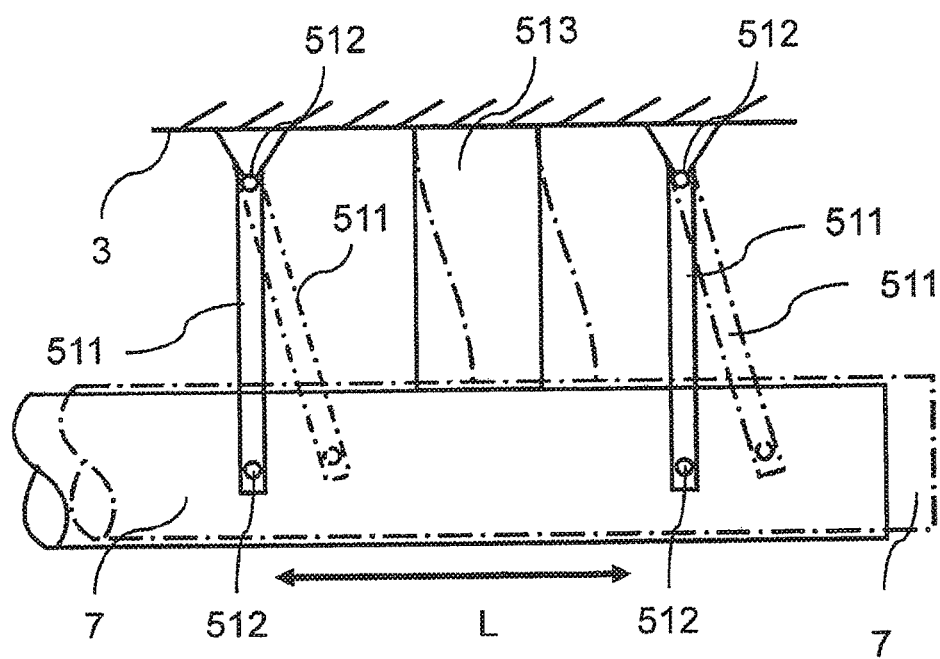
FIG. 5 a detailed view of a decoupling device according to the invention in accordance with a further embodiment.

FIG. 5 shows an alternative embodiment 510 for the decoupling device 10.

According to this embodiment, the decoupling device 510 comprises two pivot arms 511, which are each rotatably attached via low-friction rotary bearings to the trailer body 3 at one end and rotatably attached to the tow bar 7 at the opposite end and extend across the longitudinal direction L of the trailer 2.

Arranged centrically between the two pivot arms 511 is a bending body 513, which is likewise fixed at one end to the trailer body 3 and at the opposite end to the tow bar 7. Thus the bending body 513 likewise extends across the longitudinal direction L of the trailer 2 and is bendable in the longitudinal direction L.

The spring stiffness and damping of the decoupling device 510 is achieved by means of the additional bending body 513, which undergoes shearing stress under the effect of an acceleration force, while in this case the pivot arms 511 swivel in parallel. This is represented in turn in FIG. 5 by the broken lines. As already mentioned above, a particular advantage of this embodiment is that the load-bearing mechanical elements 511 in the form of the pivot arms are hardly subject to any stress. If the comparatively highly stressed bending body 513 were to be damaged, the tow bar 5, 7 would continue to be firmly connected to the trailer 3 via the pivot arms 511.

Although the invention has been described with reference to specific embodiments, it is obvious to a person skilled in the art that various modifications can be made and equivalents substituted without departing from the scope of the invention. Additionally, many modifications can be made without departing from the related scope. Consequently the invention should not be restricted to the disclosed embodiments but should rather encompass all embodiments that fall within the scope of the attached claims.

The invention claimed is:

1. A trailer for a bicycle, comprising:
   a braking device acting on at least one wheel of the trailer;
   a sensor device, which supplies a measured variable that is a measure of an acceleration force acting on the trailer via a tow bar;
   a controller for controlling the braking device of the trailer, that is configured to control the braking device, depending on the measured variable determined by the sensor device, in such a manner that an inertial force of the trailer generated during braking of the bicycle is compensated for or is at least reduced; and
   a decoupling device which is configured for a partial mechanical decoupling of a movement of the bicycle trailer with respect to the bicycle in a longitudinal direction of the bicycle trailer, wherein the decoupling device is provided in a connection between the bicycle and the trailer, and comprises two bending elements, which are each attached at one end and at an opposite end, extend in a direction transverse to the longitudinal direction of the trailer and are bendable in the longitudinal direction of the trailer.

2. The trailer according to claim 1, further comprising an electric drive to drive the trailer, wherein the controller is further configured to accelerate the trailer by way of the electric drive, dependent on the measured variable determined by the sensor device, in such a manner that an inertial force of the trailer generated during traction mode of the bicycle is compensated for or is at least reduced.

3. The trailer according to claim 2, wherein the electric drive is a wheel hub motor.

4. The trailer according to claim 2, wherein the braking device of the trailer is an electrical machine acting as a motor and also as a brake and constitutes the electric drive in motorized mode.

5. The trailer according to claim 2, wherein the trailer has an electrical energy storage device to supply the electric drive.

6. The trailer according to claim 1, wherein the sensor device is provided on the decoupling device.

7. The trailer according to claim 1, wherein the sensor device comprises at least one member selected from the group consisting of a wire resistance strain gauge, a Hall effect sensor and a piezoelectric bending beam sensor.

8. The trailer according to claim 1, wherein the decoupling device comprises limit stop means, which limit any movement of the bicycle trailer relative to the bicycle to a predetermined maximum value.

9. The trailer according to claim 1, wherein a trailer-side end of the tow bar is attached to trailer body of the trailer with the decoupling device.

10. The trailer according to claim 1, wherein the decoupling device is provided with a spring damping function.

11. The trailer according to claim 1, wherein the two bending elements are each attached at the one end to a trailer body of the trailer and at the opposite end to the tow bar.

12. The trailer according to claim 11, wherein the sensor device comprises a piezoelectric bending beam sensor that is arranged parallel to a bending element in such a manner that said piezoelectric bending beam sensor performs a deflection corresponding to the bending element.

13. The trailer according to claim 11, wherein the sensor device is executed as a Hall effect sensor, that is configured to measure the deflection of the bending elements.

14. The trailer according to claim 11, wherein the sensor device has at least one wire resistance strain gauge attached to one of the bending elements.

15. The trailer according to claim 11, wherein the two bending elements are plate-shaped.

16. The trailer according to claim 11, wherein limit stops are provided, said limit stops being arranged offset to the bending elements in the longitudinal direction of the trailer in such a manner that a deflection of the bending elements is limited in the longitudinal direction by the limit stops.

17. The trailer according to claim 1, wherein the decoupling device comprises at least one spring that is deflectable in the longitudinal direction.

18. The trailer according to claim 1, wherein the braking device is an electrically operated mechanical brake.

19. The trailer according to claim 1, wherein the sensor device is configured to determine a deflection of a moving element of the decoupling device, said deflection of the moving element being a measure for an acceleration force acting on the trailer via the tow bar.

20. The trailer according to claim 1, wherein the sensor device comprises a force sensor that is designed to measure the acceleration force acting on the decoupling device.

21. A trailer for a bicycle, comprising:
a braking device acting on at least one wheel of the trailer;
a sensor device, which supplies a measured variable that is a measure of an acceleration force acting on the trailer via a tow bar;
a controller for controlling the braking device of the trailer, that is configured to control the braking device, depending on the measured variable determined by the sensor device, in such a manner that an inertial force of the trailer generated during braking of the bicycle is compensated for or is at least reduced;
a decoupling device which is configured for a partial mechanical decoupling of a movement of the bicycle trailer with respect to the bicycle in a longitudinal direction of the bicycle trailer;
two pivot arms, which are each rotatably attached to a trailer body of the trailer at one end and rotatably attached to the tow bar at an opposite end and extend between the trailer body and the tow bar in a direction transverse to the longitudinal direction of the trailer, and
a bending body, which is attached to the trailer body at one end and to the tow bar at the opposite end, extends between the trailer body and the tow bar in the direction transverse to the longitudinal direction of the trailer and is bendable in the longitudinal direction of the trailer.

22. The trailer according to claim 21, wherein limit stops are provided, said limit stops being arranged offset to the pivot arms in the longitudinal direction of the trailer in such a manner that a deflection of the pivot arms is limited in the longitudinal direction by the limit stops.

* * * * *